United States Patent [19]

Ikebukuro

[11] 4,382,463
[45] May 10, 1983

[54] AIR CONDITIONING SYSTEM FOR MOTOR TRUCK

[75] Inventor: Munemitsu Ikebukuro, Aichi, Japan

[73] Assignee: Nippondenso Co. Ltd., Kariya, Japan

[21] Appl. No.: 278,611

[22] Filed: Jun. 29, 1981

[30] Foreign Application Priority Data

Apr. 25, 1980 [JP] Japan ............................... 55-115983
Jun. 30, 1980 [JP] Japan ............................... 55-89013

[51] Int. Cl.³ ............................................. B60H 3/00
[52] U.S. Cl. ...................................... 165/12; 98/2.01; 165/43
[58] Field of Search .......................... 236/49; 98/2.01; 165/42, 43, 12; 62/244

[56] References Cited

U.S. PATENT DOCUMENTS 4,289,195 9/1981 Bellot et al. ...................... 165/42 X Primary Examiner—William E. Wayner
Attorney, Agent, or Firm—Cushman, Darby & Cushman

[57] ABSTRACT

An air conditioning system for a motor truck for establishing thermally confortable conditions for an occupant sleeping on a berth provided in a driver's cab. The system includes an air duct for distributing part of the conditioned air to vicinity of the berth and a damper adapted to open or close the inlet of the air duct. The system may include a microcomputer for automatically controlling the temperature of the introduced air and distributing the temperature-controlled air optimumly by automatically causing the damper to open or close the inlet of the air duct depending upon whether the berth is occupied or not, the temperature outside the driver's cab and the temperature in the vicinity of the berth.

11 Claims, 11 Drawing Figures

AIR CONDITIONING SYSTEM FOR MOTOR TRUCK

BACKGROUND OF THE INVENTION

The present invention relates to an air conditioning system for a motor truck and more particularly an air conditioning system for a motor truck which controls the distribution of the conditioned air into a berth in a driver's cab.

There has been a consistent trend toward establishing more comfortable conditions in the driver's cabs of the motor trucks and special attention has been paid to an improvement of the air conditioning systems that thermally comfortable conditions may be established for an occupant sleeping or taking a nap in a berth in the driver's cab.

The conventional air conditioning systems for motor trucks have been designed and constructed only for the purpose of establishing thermally comfortable conditions for occupants of the front seat in the driver's cab and no attention has been paid for the air conditioning around the berth installed behind the front seat. As a result, the following problems and drawbacks have arisen:

(1) In spring or autumn, when the air is so heated as to establish thermally comfortable conditions for the occupants on the front seat, an occupant in the berth considerably feels cold.

(2) In winter, when the outside temperature is very low, even when an occupant on the berth uses blanket, he feels his legs cold.

(3) When one is sleeping or taking a nap for a long time on the berth in the heated cab, he feels thirsty.

(4) In spring, summer or autumn, when the air is cooled to a temperature optimum for the occupants on the front seat, the occupant sleeping on the berth feels very hot.

(5) When a curtain is drawn in the daytime, the occupant sleeping on the berth feels hot.

SUMMARY OF THE INVENTION

The present invention was made to overcome the above and other problems encountered in the prior art air conditioning systems for motor trucks. The present invention therefore has for its object to provide an air conditioning system for motor trucks which can switch the distribution of the conditioned air so that optimumly thermally comfortable conditions may be established for an occupant sleeping on the berth.

Briefly stated, to the above and other ends, the present invention provides an air conditioning system for motor trucks comprising means for introducing the air, temperature control means for controlling the temperature of the introduced air, and air distribution means for distributing the temperature-controlled air into the driver's cab, wherein the air distribution means includes an air duct for distributing at least part of the conditioned air to the vicinity of a berth in said driver's cab and a damper adapted to open or close the inlet of the air duct.

The air conditioning system in accordance with the present invention may include a temperature control means adapted to condition the air according to a program. In this case, the air conditioning system may further include means for generating a command signal for carrying out the air conditioning mainly in a space in which is installed said berth, means responsive to said command signal for changing said program to a program for carrying out the air conditioning mainly in said space in which is installed said berth, and actuating means responsive to said command signal for causing the damper to open the inlet of the air duct.

According to one embodiment of the present invention, the air conditioning system is controlled by a microcomputer and the command signal is generated when a sleep switch is manually closed by an occupant in the front seat and when the berth is occupied.

When the air conditioning system in accordance with the present invention is used for heating the driver's cab, the outlet of the air duct is opened to the vicinity of the berth and the damper actuating means is activated when the outside temperature is lower than a set temperature.

When the air conditioning system in accordance with the present invention is used for cooling the driver's cab, the outlet of the air duct is opened to a position above the berth and the damper actuating means is activated in response to the command signal and preferably to a signal generated when the temperature in the vicinity of the berth is higher than a set temperature.

The air conditioning system in accordance with the present invention can be used for heating and cooling the driver's cab. In this case, the system includes a first air duct whose outlet is opened to a position above the berth for distributing the cooled air downwardly, a first damper adapted to open or close the inlet of the first air duct, a second air duct whose outlet is opened to the vicinity of the berth, a second damper adapted to open or close the inlet of the second air duct, first and second damper actuating means adapted to cause said first and second dampers to open the inlets, respectively, of the first and second air ducts, and a temperature sensor so disposed as to detect the temperature in the vicinity of the berth in response to the command signal, wherein when the temperature detected is higher than a desired temperature, the first damper actuating means is activated so as to distribute the cooled air through the first air duct, but when the detected temperature is lower than the desired temperature, the second damper actuating means is activated so as to distribute the hot air through the second air duct into the berth space.

The above and other objects, effects and features of the present invention will become more apparent from the following description of preferred embodiments thereof taken in conjunction with the accompanying drawings.

BRIEF DESCRIPTION OF THE DRAWINGS

Same reference numerals are used to designate similar parts throughout the figures.

DESCRIPTION OF THE PREFERRED EMBODIMENTS

Figure 1:
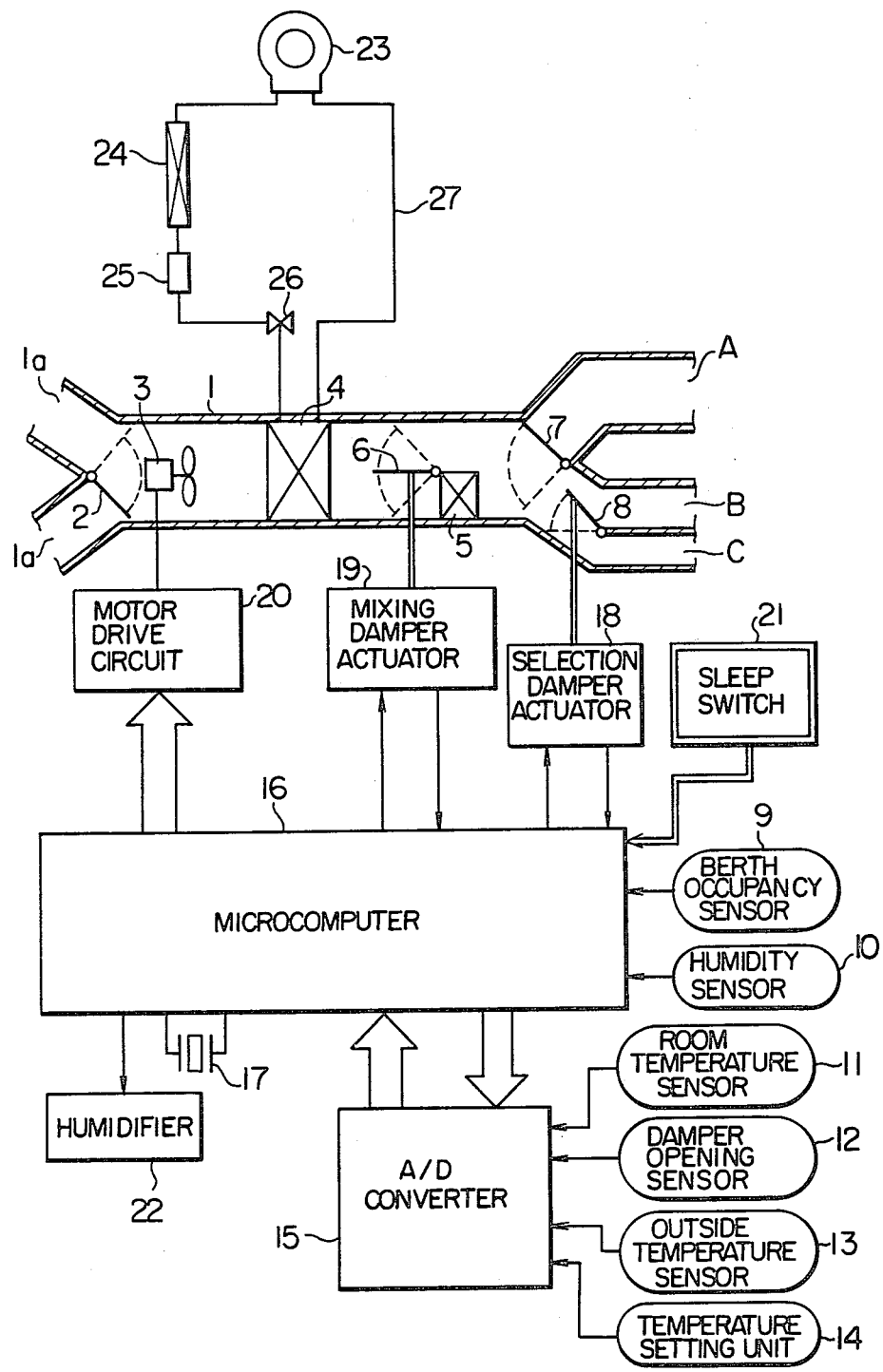
FIG. 1 is a schematic block diagram of a first embodiment of the present invention which is adapted to heat a berth space in a driver's cab.
Figure 2:
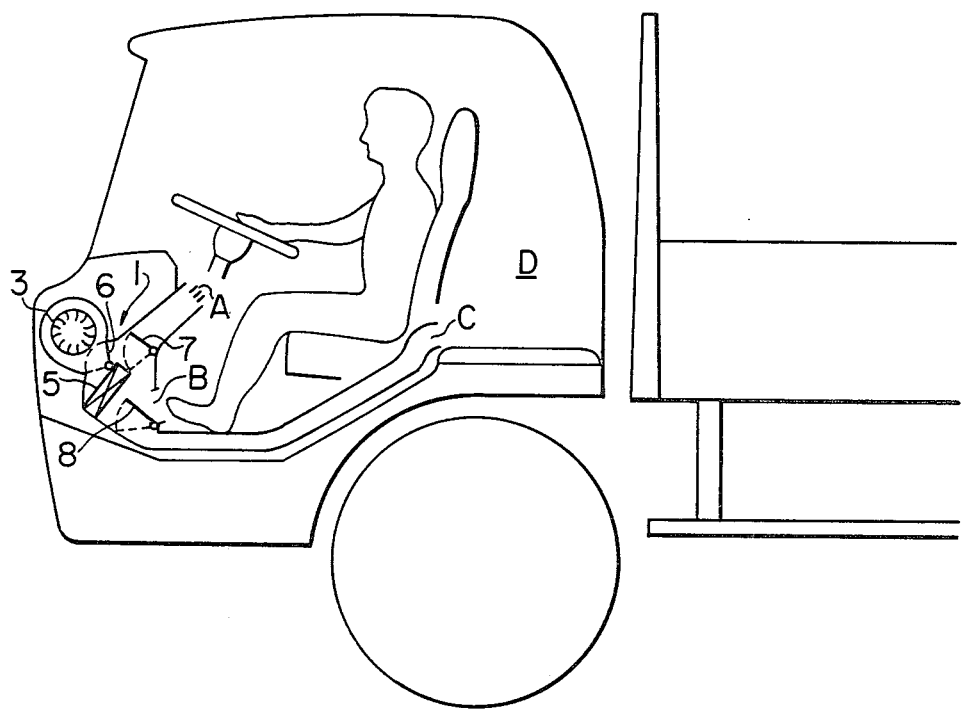
FIG. 2 is a schematic view showing the arrangement of the first embodiment in the driver's cab.

A first embodiment of the present invention for heating a space in a driver's cab in which is installed a berth will be described in conjunction with FIG. 1 showing in schematic diagram of an air-conditioning system and FIG. 2 showing its arrangement in a driver's cab of a truck.

In FIGS. 1 and 2, an air duct 1 has an outside air inlet 1a for drawing the atmospheric air from the outside of the truck and a recirculation air inlet 1b for drawing the air in the driver's cab for recirculation. A manually operated damper 2 is disposed at the junction between the inlets 1a and 1b for selectively closing the outside-air inlet 1a or the recirculation-air inlet 1b so that ventilation or recirculation may be carried out. The ventilation mode; that is, the mode in which the outside air is introduced into the driver's cab is indicated by the solid lines while the recirculation mode is indicated by the broken lines. Downstream of the damper 2 is disposed a blower 3 for drawing the outside air or the recirculation air and flowing it through the air duct 1. The flow rate of the air through the duct 1 is controlled by varying the rotational speed of the motor for the air blower 3. Downstream of the air blower 3 is disposed an evaporator 4 transversely of the air duct 1 so as to cool the air passing therethrough. A refrigeration cycle includes the evaporator 4, a compressor 23 which is engageable with an engine, a condenser 24, a receiver 25, an expansion valve 26, and a refrigerant line 27 interconnecting these components. Downstream of the evaporator 4 is disposed a heating core 5 through which is circulated the cooling water from the engine so that the air passing through the duct 1 may be heated by the heat dissipated from the cooling water. Upstream of the heating core 5 is disposed an air mixing damper 6 which is adapted to control the ratio of the quantity of the air to be introduced into the heating core 5 to the quantity of the air that has passed through the evaporator 4, whereby the cooled air and the heated air may be mixed to obtain the conditioned air at a desired temperature. The degree of opening of the mixing damper 6 is automatically controlled in response to the signals representative of the temperatures of airs outside and inside of the driver's cab, respectively, and the feedback signal representative of the opening degree of the mixing damper 6 in such a way that the desired temperature may be maintained in the driver's cab. Downstream of the heating core 5 is disposed an upper air-distribution selection damper 7 which, when switched to the position indicated by the broken lines, directs the conditioned air to air distribution outlets A which are opened upwardly from the instrument panel at the center and ends thereof, so that the conditioned air may be distributed upwardly in the driver's cab. When the upper damper 7 is maintained in the position indicated by the solid line, the conditioned air is directed toward air distribution outlets B and C. Downstream of the damper 7 is disposed a lower air-distribution selection damper 8. When the lower damper 8 is in the position indicated by the solid line, the flow rate of the conditioned air flowing toward the air distribution outlet C which is opened at a berth space D becomes by far higher than that of the conditioned air flowing to the air distribution outlet B which is opened in the vicinity of the driver's seat. When the lower damper 8 is maintained in the position indicated by the broken lines, no conditioned air can flow toward the air distribution outlet C so that all the conditioned air flows to the air distribution outlet B. The air distribution outlet C is opened at one end of the berth and adjacent to the feet of an occupant sleeping on the berth D.

A pressure-responsive occupancy sensor 9 is disposed below the berth D so that when the driver rides on the berth D, the occupancy sensor 9 is closed. To put in another way, the sensor 9 is provided in order to detect whether the berth D is occupied or not and generates a signal when the berth D is occupied. A humidity sensor 10 is installed in the driver's cab so as to detect a predetermined humidity at which the occupant sleeping on the berth feels thirsty. The humidity sensor 10 consists of a semiconductor whose electrical resistance varies in response to the relative humidity in the driver's cab.

In the driver's cab is installed a temperature sensor 11 for generating the signal representative of the prevailing temperature in the cab. A damper sensor 12 is adapted to generate the signal representative of the degree of opening of the mixing damper 6 in the duct 1. The sensor 12 consists of a potentiometer whose sliding contact moves in response to the degree of opening of the damper 6. In order to detect the ambient temperature outside the driver's cab, an outside temperature sensor 13 is installed. In order to set a desired temperature in the driver's cab, a manually operable temperature setting unit 14 is provided.

The output signals, which are analog, from the sensor 11 through 13 and the temperature setting unit 14 are converted into respective digital signals by an A/D converter 15.

The sequence for controlling the air conditioning system is previously programmed in a single-chip microcomputer 16 which is connected to a quartz oscillator 17 with an oscillation frequency of the order of a few MHz and to a stabilized power supply (not shown) which is connected to the batteries on the truck and adapted to supply a stabilized voltage of 5 V to the microcomputer 16. As described above, the microcomputer 16 comprises one-chip LSI including a ROM (read-only memory) in which is stored various constants and a control program for controlling the air conditioning system, a CPU (central processing unit) for reading out the control program from the ROM so as to execute required operations, a RAM (random access memory) which temporarily stores various data related to the operations to be executed with the CPU and allows the CPU to read out the data stored therein, a clock generator connected to the quartz oscillator 17 so as to generate clock pulses in response to which the operations are executed in the microcomputer 16 and an input-output device for controlling various input and output signals to and from the microcomputer 16. In response to the output signals from the sensors 9 through 13 and the temperature setting unit 14, the microcomputer 16 generates various command signals in response to which the rotational speed of the motor for the air blower 3, the degree of opening of the mixing damper 6 and the positions of the upper and lower dampers 7 and 8 are controlled.

A damper switching actuator 18 incorporates a flip-flop which is activated in response to the set or reset signal derived from the microcomputer 16. In response to the output signal from the flip-flop, an electromagnetic valve is controlled so as to switch the lower damper 8 between the two positions described previously. In this embodiment, the damper 8 is driven by a diaphragm (not shown) and the electromagnetic valve controls the negative pressure to be applied to the diaphragm which is exerted with the force of a bias spring (not shown).

A mixing damper control actuator 19 is adapted to control the degree of opening of the mixing damper 6 and including a drive circuit which amplifies the command signal from the microcomputer 16. In response to the output signal from the drive circuit, the mixing damper 6 is caused to swing to set and maintain its opening degree. In order to drive the mixing damper 6 in this manner, the actuator 19 includes a diaphragm actuator which is communicated with either of the atmospheric pressure or a negative pressure source through respective solenoid-operated valves which in turn are controlled in response to the command signals from the microcomputer 16.

A motor drive circuit 20 controls the rotational speed of the motor for the air blower 3. That is, the command signal from the microcomputer 16 is latched and passed through a D/A converter and a chopper so as to be applied to the motor. When a switch for activating the system (not shown) is turned on, the stabilized power supply (not shown) supplies the stabilized voltage of 5 volts to the electronic control system including the microcomputer 16, the sensors 9 through 13, the temperature setting unit 14, the actuators 18 and 19 and the driver circuit 20.

Figure 3:
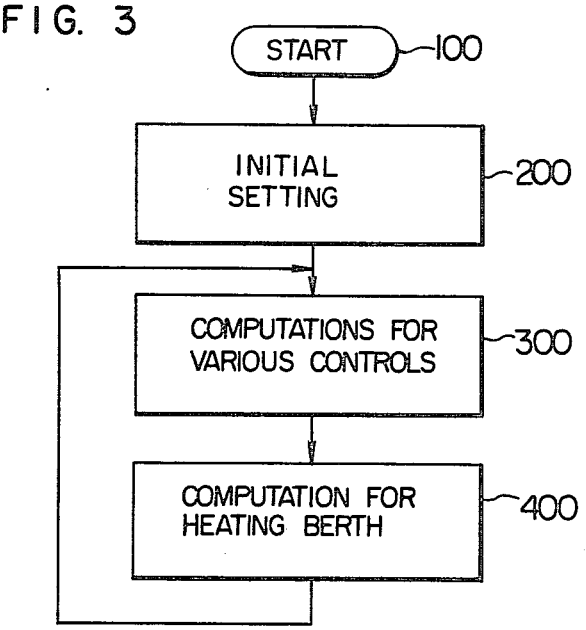
FIG. 3 shows a flow chart of a master routine of a microcomputer of the first embodiment.

A sleep switch 21 which is installed in the instrument panel in the driver's cab generates an initial input signal shown in a control program shown in FIG. 3. The switch 21 may be installed in the berth space D or two switches 21 may be installed on the instrument panel and in the berth space D, respectively.

A humidifier 22 is installed in the vicinity of the co-driver's seat and is activated in response to the output signal from the humidity sensor 10 via the microcomputer 16.

Figure 4:
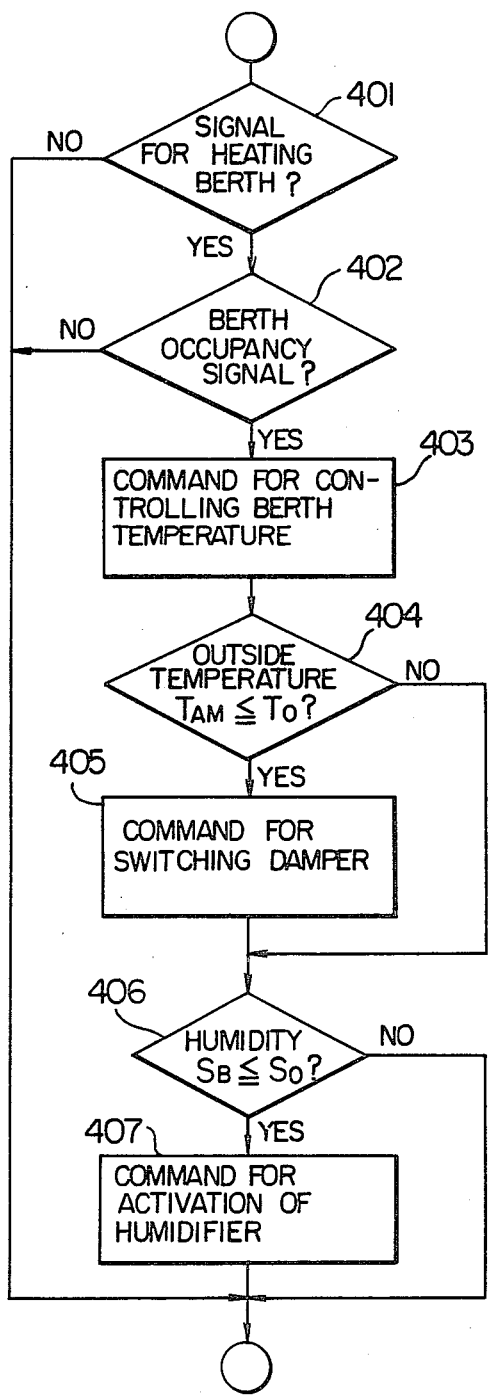
FIG. 4 shows a flow chart of a subroutine for switching the distribution of the heated air into the berth space.

Next referring to FIGS. 3 and 4, the mode of operation of the air conditioning system with the above-described construction and arrangement will be described in more detail below. FIG. 3 shows the flow chart for the microcomputer 16 while FIG. 4 shows the detailed flow chart of the program for controlling the heating of the berth space D.

When the switch of the air conditioning system is turned on, the stabilized power supply supplies the stabilized voltage to various circuits in the air conditioning system through a key switch (not shown).

The microcomputer 16 is started as shown at a start step 100 in FIG. 3 and proceeds to an initial setting routine 200 so as to set the registers, counter latches and the like in the microcomputer 16 to their initial conditions and reset the flip-flop (not shown) in the actuator 18.

At a routine 300 of computations for various controls, in response to the output signals from the room temperature sensor 11, the damper sensor 12, the outside temperature sensor 13 and the temperature setting unit 14, the microcomputer 16 executes operations required for controlling the rotational speed of the motor of the air blower 3 and the degree of opening of the mixing damper 6.

At a routine 400 for heating the berth space, when the sleep switch 21 is kept opened, the decision of a first step 401 of the routine 400 for heating the berth space is "NO" as shown in FIG. 4 so that the routine 400 returns to the routine 300. The above operations executed through the routines 300 and 400 are repeated at a frequency of one cycle per hundreds milliseconds. In this condition, as the result of operations executed through the routine 300, the rotational speed of the air blower 3 is controlled as desired and the mixing damper 6 is so set that the room temperature in the driver's cab may be maintained as nearly as the temperature set by the temperature setting unit 14. In addition, since the flip-flop in the lower damper switching actuator 18 has been reset as described previously, no negative pressure is applied to the diaphragm thereof so that the lower damper 8 is maintained in the position indicated by the broken lines in FIG. 1.

When the sleep switch 21 is depressed under the above condition, the command signal for heating the berth space is generated so that the decision at the step 401 is changed from "NO" to "YES" and the program proceeds to the next step 402. When an occupant is sleeping on the berth, the decision at the step 402 is "YES" so that the program further proceeds to the step 403 for switching the program of the microcomputer 16 to another program according to which the temperature of the conditioned air is controlled to be optimum mainly for the occupant on the berth, that is the temperature is raised by a predetermined level. The program further proceeds to the step 404 at which the outside temperature $T_{AM}$ detected by the sensor 13 is compared with a set outside temperature $T_o$ and when the former is lower than the latter, the program proceeds to the step 405. At the step 405, the switching actuator 18 is activated so that the lower damper 8 is switched to the position indicated by the solid line in FIG. 1. As a result, the conditioned air begins to flow through the air distribution outlet C into the berth space D. At the next step 406, the detected humidity $S_B$ is compared with the set humidity $S_o$ and when the former is lower than the latter, the program proceeds to the next step 407 so that the humidifier 22 is activated. Thus, one cycle of the routine 400 for heating the berth space D has been accomplished so that the microcomputer 16 returns to the routine 300. The operations executed through the routines 300 and 400 in the manner as described are repeated at a period of hundreds milliseconds so that the lower damper 8 may be maintained in the position indicated by the solid line in FIG. 1 and consequently the conditioned air may be distributed into the berth space D through the air distribution outlet C.

When the humidity $S_B$ detected by the humidity sensor 10 becomes higher than the set humidity $S_o$, the decision at the step 404 becomes "NO" so that the microcomputer 16 returns to the routine 300 by bypassing the step 407 and consequently the humidifier 22 is deactivated until the detected humidity $S_B$ becomes lower than the set humidity $S_o$. However, the conditioned air keeps flowing into the berth space D.

When the outside temperature $T_{AM}$ rises above the set temperature $T_o$, the occupant leaves the berth or the sleep switch 21 is turned off, the microcomputer 16 immediately returns to the routine 300 without executing the step 405. As a result, the reset signal is applied to the flip-flop in the switching actuator 18 so that the lower damper 8 is returned to the position indicated by the broken lines in FIG. 1, whereby the distribution of the conditioned air into the berth space D is interrupted.

The first embodiment may be modified in the manner to be described below. That is, the berth sensor 9 and consequently the step 402 may be eliminated so that when the sleep switch 21 is turned on, the microcomputer 16 immediately executes the step 403 for controlling the temperature in the berth space D. If the humidity control in the driver's cab may be sacrificed, the steps 406 and 407 for detecting the humidity difference and activating or deactivating the humidifier 22 may be eliminated. In addition, in order to confirm that the motor truck is stopped while the occupant is sleeping on the berth, a step for detecting whether an idling signal is generated or not may be added downstream of the step 401 for detecting whether or not the sleep switch 21 is turned on. So far the switching of the lower damper 8 has been described as being made in response to the result of the step 404 which compares the detected outside temperature $T_{AM}$ with the set outside temperature $T_o$, but it is to be understood that the switching may be made in response to a room temperature suitable for the occupant in the berth space D or the temperature around the feet of the occupant on the berth.

Figure 5:
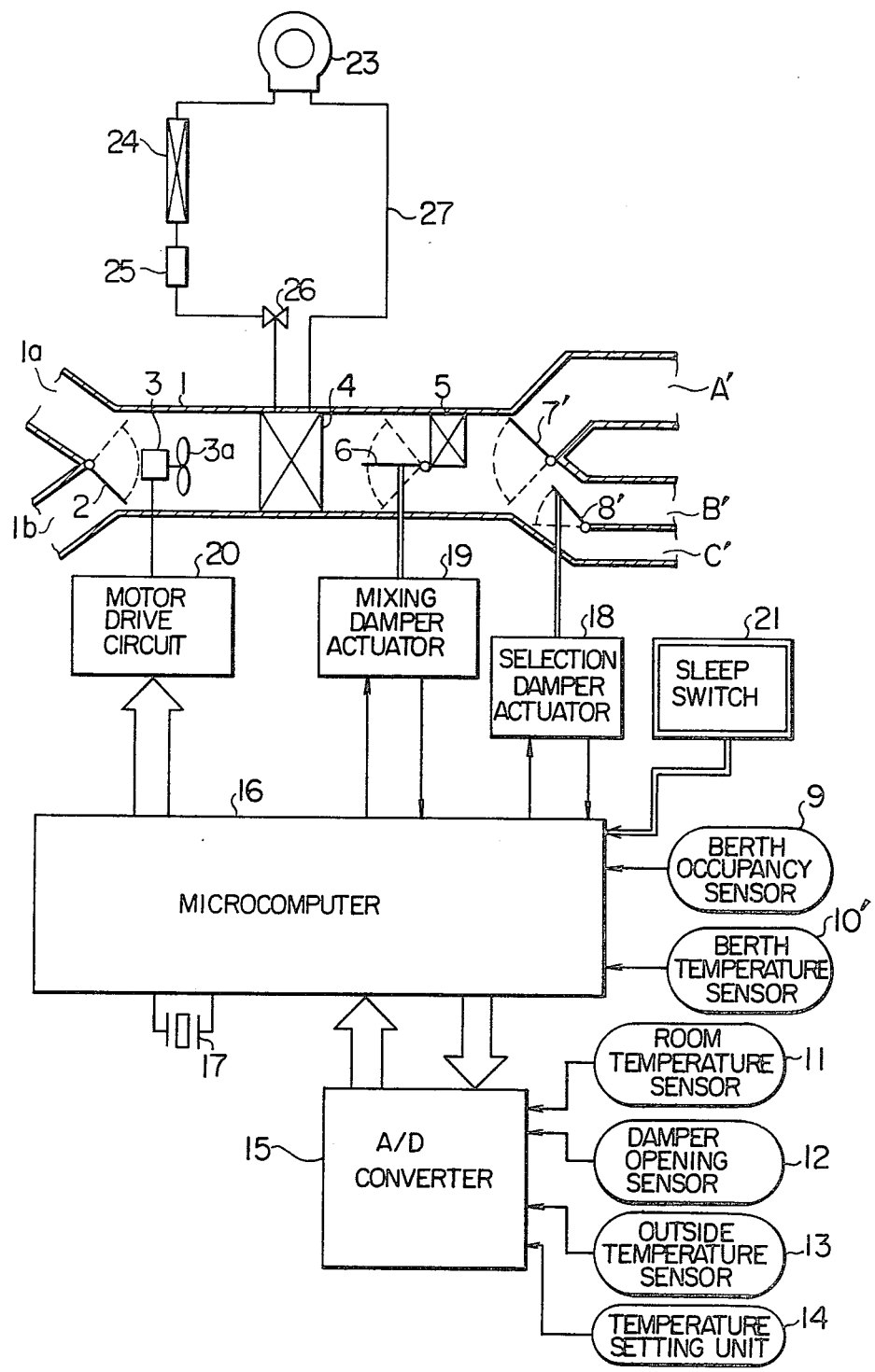
FIG. 5 is a schematic block diagram of a second embodiment of the present invention which is adapted to cool a berth space in the driver's cab.

Next a second embodiment of the present invention for cooling the berth space D will be described in conjunction with FIGS. 5, 6 and 7. FIG. 5 shows in schematic block diagram the air conditioning system while FIGS. 6 and 7 show two examples, respectively, of the arrangement thereof in the driver's cab.

The second embodiment is a modification of the first embodiment shown in FIG. 1 and therefore is substantially similar in construction thereto except some modifications to be described below. That is, when a lower air-distribution selection damper 7' is maintained in the position indicated by the broken lines in FIG. 5, the conditioned air is directed to the lower air distribution outlet A' opened in front of the front seat and at the center and right and left ends thereof so that the conditioned air is distributed downwardly toward the floor. However when the damper 7' is maintained in the position indicated by the solid line, the conditioned air is directed to flow toward the air distribution outlets B' and C'. In the second embodiment, a damper switching actuator 18 is operatively connected to an upper air-distribution selection damper 8' to switch the latter between two positions. When the upper damper 8' is maintained in the position indicated by the solid line in FIG. 5, the flow rate of the conditioned air flowing into the berth space D through the air distribution outlet C' (See FIG. 6 or 7) becomes by far greater than that of the conditioned air flowing into the driver's seat through the air distribution outlet B'. But when the upper damper 8' is maintained in the position indicated by the broken lines in FIG. 5, the flow of the conditioned air through the air distribution outlet C' into the berth space D is interrupted while all the conditioned air is distributed through the air distribution outlet B' upwardly into the driver's seat when the directional control damper 7' is maintained in the position indicated by the solid line.

Figure 6:
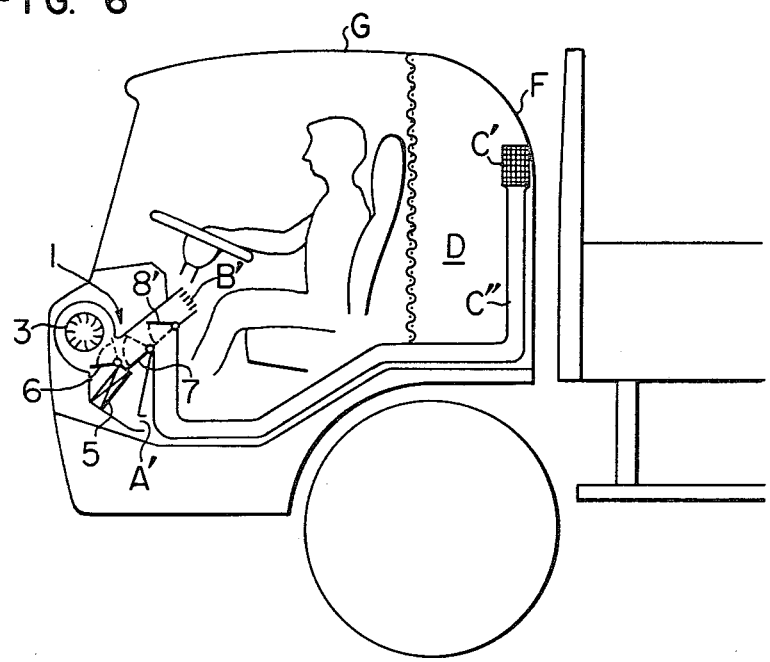
FIG. 6 is a schematic view showing the arrangement of the second embodiment in which an air distribution outlet is disposed at the upper portion of the rear panel of the cab.
Figure 7:
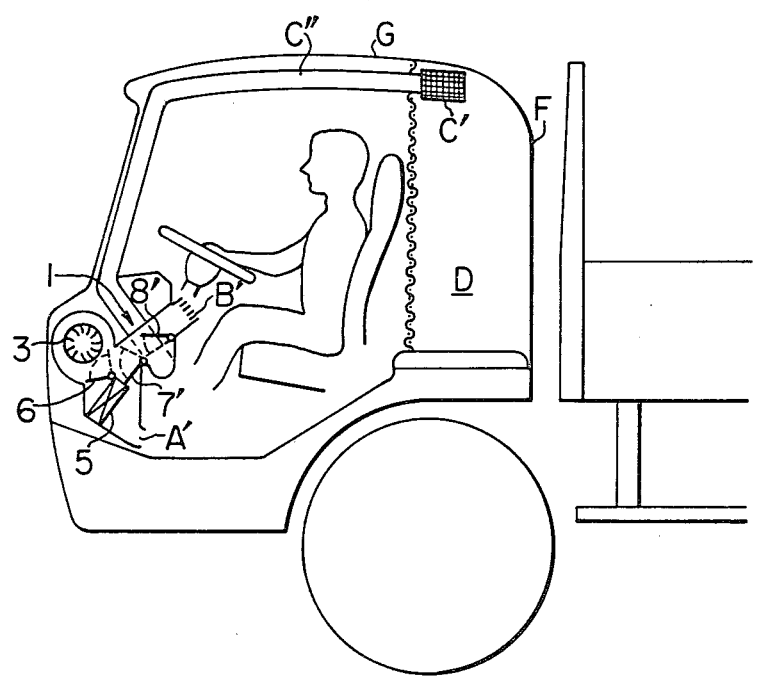
FIG. 7 is a schematic view similar to FIG. 6 in which an air distribution outlet is disposed at the rear portion of the roof of the driver's cab.

The distribution outlet C' communicated with the air duct 1 through a distribution duct C" may be opened to the vicinity of the both sides of the upper part of the rear panel F of the compartment, as shown in FIG. 6, or to the vicinity of the rear portion of the roof G of the cab, as shown in FIG. 7, so as to deliver the cooled air downwardly to the occupant sleeping on the berth D.

A further difference of the second embodiment from the first embodiment is that the humidifier as shown in FIG. 1 is eliminated and, instead of the humidity sensor 10, a temperature sensor 10' is provided which is actuated only when the sleep switch is closed so as to detect the temperature in the berth space D.

Figure 8:
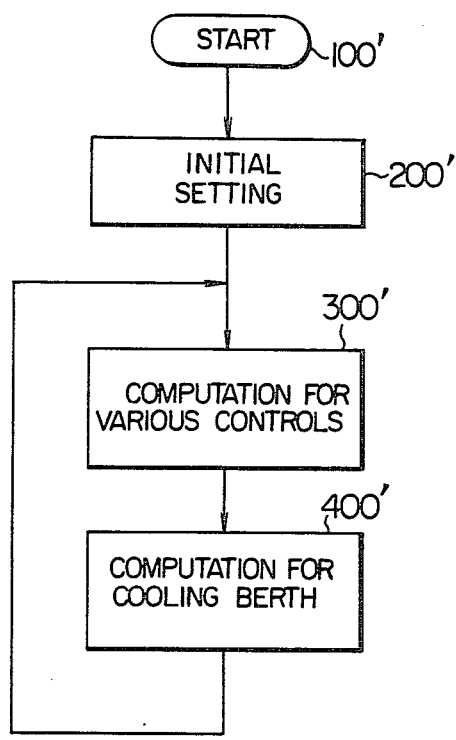
FIG. 8 is a flow chart of a master routine of the second embodiment.
Figure 9:
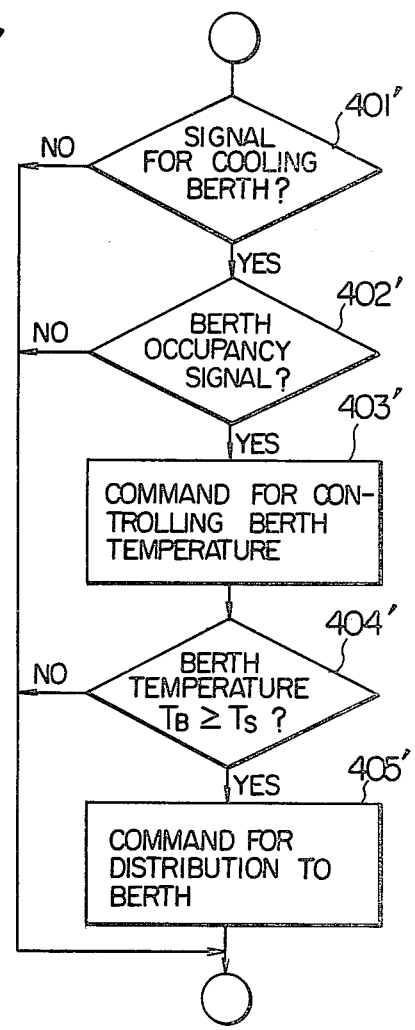
FIG. 9 is a flow chart of a subroutine for switching the air distribution into the berth space in the second embodiment.

Referring to FIGS. 8 and 9, the mode of operation of the second embodiment will be described in more detail below. FIG. 8 shows the flow chart of the master routine of the microcomputer 16 while FIG. 9 shows the flow chart of the subroutine for cooling the berth space D.

When the switch of the air conditioning system is turned on, the stabilized voltage supply supplies the stabilized voltage to various circuits in the system. The microcomputer 16 is started (See 100') and at an initial setting routine 200' the registers, counter latches and the like in the microcomputer 16 are set to their initial conditions and the flip-flop in the actuator 18 is reset. At a routine 300' of computations for various controls, in response to the output signals from the room temperature sensor 11, the damper sensor 12, the outside temperature sensor 13 and the temperature setting unit 14, the microcomputer 16 controls the rotational speed of the air blower 3 and the degree of opening of the mixing damper 6.

At a routine 400 for cooling the berth space, when the sleep switch 21 is kept turned off, the decision of a first step 401' in the routine 400' is "NO" as shown in FIG. 9 so that the microcomputer 16 returns to the routine 300' and executes various operations with an execution time of hundreds milliseconds, thereby controlling the rotational speed of the air blower 3 and the degree of opening of the mixing damper 6 so that the temperature in the driver's cab may be maintained as nearly as the temperature set by the temperature setting unit 14. In addition, since the flip-flop in the upper damper switching actuator 18 has been reset, no negative pressure is applied to the diaphragm thereof (not shown) so that the upper damper 8' is maintained at the position indicated by the broken lines in FIG. 5 under the force of the bias spring (not shown).

When the sleep switch 21 is turned on under these conditions, the decision of the step 401' is changed from "NO" to "YES" so that the microcomputer 16 proceeds to the step 402'. When the occupant is sleeping on the berth D, the decision at the step 402' is "YES" so that the microcomputer 16 further proceeds to the step 403' for starting the control of the temperature in the berth space D. When the temperature $T_B$ in the berth space D detected by the temperature sensor 10' is higher than the set temperature Ts at the step 404', the microcomputer 16 proceeds to the step 405' so that the actuator 18 is activated so as to switch the upper damper 8' to the position indicated by the solid line in FIG. 5. As a result, the conditioned air (cooled air) is distributed into the berth space D. Then the microcomputer 16 returns to the routine 300' again and repeats the above-described cycle with a period of hundreds milliseconds. As a result, the upper damper 8' is maintained in the position indicated by the solid line in FIG. 5 so that the cooled air continues to flow into the berth space D.

When the detected temperature $T_B$ in the berth space D becomes lower than the set temperature Ts or the occupant leaves the berth D or the sleep switch 21 is turned off, the microcomputer 16 returns immediately to the routine 300 without proceeding to the step 405' so that the flip-flop in the damper-position switching actuator 18 is reset again and consequently the upper damper 8' is switched to the position indicated by the broken lines in FIG. 5. As a result, the distribution of the conditioned or cooled air into the berth space D is interrupted.

The second embodiment of the present invention may be modified as will be described below. That is, the sensor 9 and subsequently the step 402' may be eliminated so that when the sleep switch 21 is closed, the microcomputer may immediately proceed to the step 403'. Furthermore, in order to confirm that the motor truck is stopped while the occupant is sleeping on the berth, a step for detecting whether or not an idling signal is generated may be inserted immediately after the step 401'.

The second embodiment described so far has for its main object to cool the berth space D, but it may be so modified as to accomplish both the conditionings for cooling and heating as will be described in detail below.

Figure 10:
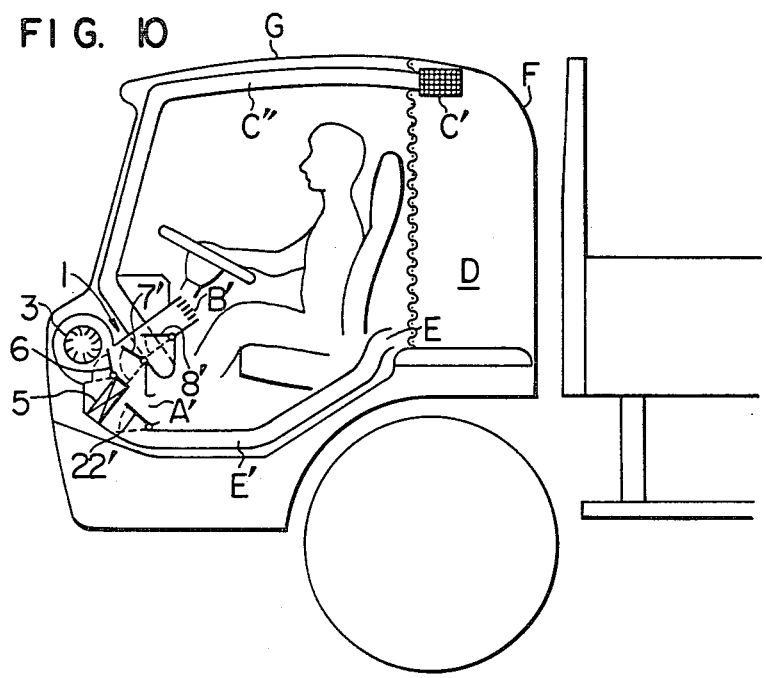
FIG. 10 shows schematically a modification of the second embodiment which is adapted not only to heat but also cool the berth space.

A modification shown in FIG. 10 is substantially similar in construction to the second embodiment shown in FIGS. 5 through 9 except that one of the lower air distribution outlet A' is communicated through a second air distribution duct E' with an air distribution outlet E opened at the lower portion of the berth space D. A directional control damper 22' is swingably disposed at the inlet of the air distribution duct E' so that when the damper 22' is maintained in the position indicated by the solid line, a substantial part of the conditioned air directed to flow to the air distribution outlet A' may be redirected to flow into the second air distribution duct E' and be distributed through the outlet E into the berth space D, but when the damper 22' is maintained in the position indicated by the broken lines, the inlet of the second air distribution duct E' is closed so that the conditioned air is distributed only through the lower air distribution outlet A' and the distribution of the conditioned air through the duct E' into the space D is interrupted.

Figure 11:
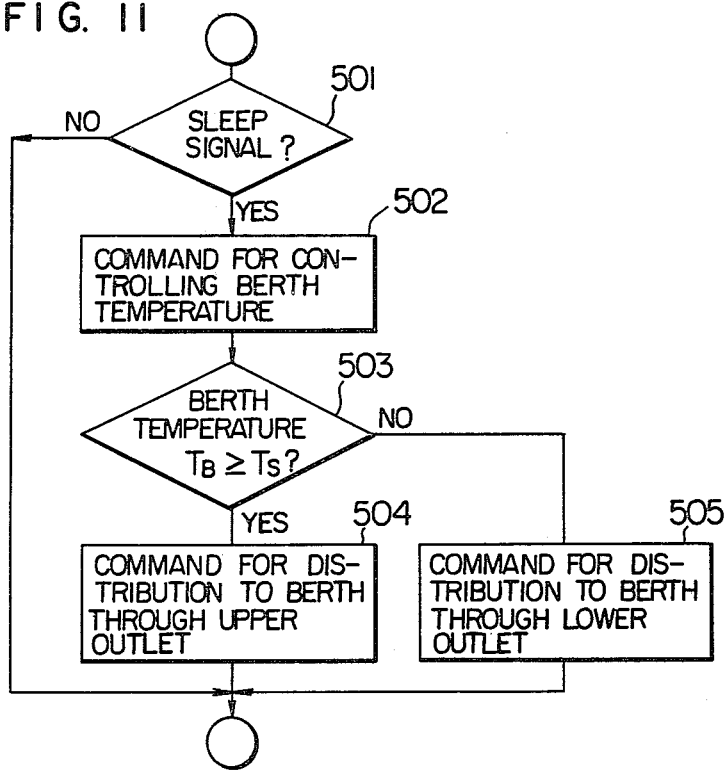
FIG. 11 shows a flow chart of a subroutine of the modification for controlling the air distribution into the berth space.

The air conditioning in the berth space in this modification is controlled by the subroutine shown in FIG. 11. When the sleep switch 21 is closed, the decision at the step 501 becomes "YES" so that the microcomputer 16 proceeds from the step 501 to the step 502 at which the program of the microcomputer is switched from the program suitable for air-conditioning in the driver's seat to that in the berth space D. The microcomputer 16 further proceeds to the step 503 at which when the temperature $T_B$ in the berth space D detected by the temperature sensor 10' is higher than the set temperature Ts, the decision is "YES" so that the microcomputer 16 proceeds to the step 504 for switching the upper damper 8' to the position indicated by the solid line in FIG. 10 so as to distribute the cooled air through the outlet C' into the berth space D. On the other hand, when the detected temperature $T_B$ is lower than the set temperature Ts, the decision at the step 503 is "NO" so that the microcomputer 16 proceeds to the step 505 for switching the damper 22' to the position indicated by the solid line in FIG. 10 so as to distribute the warm air through the distribution outlet E into the berth space D. In this case, the upper damper 8' is switched to the position indicated by the broken lines so that no air is distributed from the upper air distribution outlet C'.

In summary, according to the present invention, when the sleep switch 21 is closed, the air conditioning system can operate to establish thermally comfortable conditions for an occupant sleeping on the berth. It is apparent that at least the fundamental object of the present invention may be accomplished even with the directional control damper 8 or 8' so designed and constructed as to be manually operable.

What is claimed is:

1. An air conditioning system for a motor truck having a berth in a driver's cab comprising:
    means for introducing air;
    temperature control means for automatically controlling the temperature of the introduced air according to a program;
    air distribution means for distributing the temperature-controlled air into the driver's cab, said air distribution means including duct means for distributing at least part of the temperature-controlled air to the vicinity of said berth and switching damper means adapted to open or close the inlet of said duct means;
    means for generating a signal for carrying out the air conditioning mainly in a space in which said berth is installed;
    means responsive to said signal for changing said program to a program for carrying out the air conditioning mainly in said berth space; and
    actuating means responsive to said signal for causing said switching damper means to open said inlet of said duct means.

2. An air conditioning system for a motor truck as set forth in claim 1, wherein
    said signal generating means is adapted to generate said signal when said berth is occupied.

3. An air conditioning system for a motor truck as set forth in claim 1 or 2 further comprising an outside temperature detection means responsive to said signal for detecting the outside temperature, wherein when the detected outside temperature is lower than a set temperature, said switching damper actuating means is activated so as to cause said switching damper means to open said inlet of said duct means.

4. An air conditioning system for a motor truck as set forth in claim 1, wherein
    said signal generating means comprises a sleep switch which is manually operable and a berth switch which in turn responds to the occupancy of said berth and is adapted to generate said signal in response not only to the operation of said sleep switch but also to the operation of said berth switch.

5. An air conditioning system for a motor truck as set forth in claim 1, 2 or 4 further comprising humidity detection means for detecting the humidity in said driver's cab and a humidifier adapted to be activated when the humidity detected by said humidity detection means is lower than a set humidity.

6. An air conditioning system for a motor truck having a berth in a driver's cab comprising:
 means for introducing air;
 temperature control means for cooling and heating the introduced air to a desired temperature; and
 air distribution means for distributing the temperature-controlled air into the driver's cab, said air distribution means including first duct means for distributing at least part of the air controlled at a low temperature to a space in said driver's cab in which said berth is installed, first switching damper means adapted to open or close the inlet of said first duct means, second duct means for distributing at least part of the air controlled at a high temperature to the vicinity of said berth, and second switching damper means adapted to open or close the inlet of said second duct means.

7. An air conditioning system for a motor truck having a berth in a driver's cab comprising:
 means for introducing air;
 temperature control means including a microcomputer which generates according to a predetermined program a control signal for automatically controlling the temperature of the introduced air;
 air distribution means for distributing the temperature-controlled air into the driver's cab, said air distribution means including duct means for distributing at least part of the temperature-controlled air to the vicinity of said berth and switching damper means adapted to open or close the inlet of said duct means;
 means for generating an instruction signal for carrying out the air conditioning mainly in a space in which said berth is installed;
 said microcomputer being responsive to said instruction signal to carry out the air conditioning mainly in said berth space; and
 actuating means responsive to said instruction signal for causing said switching damper means to open said inlet of said duct means.

8. An air conditioning system for a motor truck having a berth in a driver's cab comprising:
 means for introducing air;
 temperature control means for automatically cooling and heating the introduced air to a desired temperature according to a program;
 air distribution means for distributing the temperature-controlled air into the driver's cab, said air distribution means including duct means for distributing at least part of the air controlled at a low temperature to a space in said driver's cab in which said berth is installed, and switching damper means adapted to open or close the inlet of said duct means;
 means for generating a signal for carrying out the air conditioning mainly in said berth space;
 means responsive to said signal for changing said program to a program for carrying out the air conditioning mainly in said berth space; and
 actuating means responsive to said signal for causing said switching damper means to open said inlet of said duct means.

9. An air conditioning system for a motor truck as set forth in claim 8 wherein
 said signal generating means is adapted to generate said signal when the berth is occupied by a crew.

10. An air conditioning system for a motor truck as set forth in claim 8 or 9 further comprising a temperature detection means responsive to said signal for detecting the temperature in the vicinity of the berth, wherein when the temperature detected by said temperature detection means is higher than a set temperature, said damper actuating means is activated so as to cause said damper means to open said inlet of said duct means.

11. An air conditioning system for a motor truck as set forth in claim 10 further comprising
 second duct means adapted to distribute at least part of the air controlled at a high temperature to the vicinity of the berth,
 second switching damper means adapted to open or close the inlet of said second duct means, and
 second damper actuating means adapted to cause said second switching damper means to open said inlet of said second duct means when the temperature detected by said temperature detection means is lower than the set temperature.

* * * * *

UNITED STATES PATENT AND TRADEMARK OFFICE
CERTIFICATE OF CORRECTION

PATENT NO. : 4,382,463
DATED : May 10, 1983
INVENTOR(S) : Munemitsu IKEBUKURO

It is certified that error appears in the above-identified patent and that said Letters Patent is hereby corrected as shown below:

On the title page re Priority Data [Item 30]

First line replace "Apr. 25, 1980 [JP]  Japan...55-115983"

by --Aug. 25, 1980 [JP]  Japan...55-115983--

Signed and Sealed this

Twenty-fourth Day of January 1984

[SEAL]

Attest:

GERALD J. MOSSINGHOFF

Attesting Officer

Commissioner of Patents and Trademarks